United States Patent [19]
Wood et al.

[11] Patent Number: 5,133,381
[45] Date of Patent: Jul. 28, 1992

[54] DUAL RANGE PERIODIC CHEMICAL DISPENSER FOR SWIMMING POOLS

[75] Inventors: Richard B. Wood, Bristol, Conn.; Christopher M. Zetena, Cincinnati, Ohio; Richard M. Mullins, Madison, Conn.; Carl V. Schatz, Satsuma, Ala.

[73] Assignee: Olin Corporation, Cheshire, Conn.

[21] Appl. No.: 605,201

[22] Filed: Oct. 29, 1990

[51] Int. Cl.$^5$ ............................................. B01D 11/02
[52] U.S. Cl. ................................. 137/268; 422/264; 422/282
[58] Field of Search ............................ 137/268, 205.5; 422/282, 264, 274, 275, 276, 281; 239/310

[56] References Cited

U.S. PATENT DOCUMENTS

| | | |
|---|---|---|
| 370,798 | 10/1887 | MacKintosh . |
| 976,665 | 11/1910 | Ledoux . |
| 2,808,934 | 10/1957 | Rivas . |
| 3,107,156 | 10/1963 | Fredericks . |
| 3,383,178 | 4/1968 | Dietz . |
| 3,401,116 | 9/1968 | Stanwood . |
| 3,474,817 | 10/1969 | Bates et al. . |
| 3,507,624 | 4/1970 | Schneider et al. . |
| 3,578,776 | 5/1971 | Schneider, Jr. et al. . |
| 3,802,845 | 4/1974 | Tepas, Jr. . |
| 3,846,078 | 11/1974 | Brett . |
| 3,864,090 | 2/1975 | Richards . |
| 3,972,966 | 8/1976 | Lund et al. . |
| 4,035,299 | 7/1977 | Vroeginday . |
| 4,181,702 | 1/1980 | Watson . |
| 4,199,001 | 4/1980 | Kratz . |
| 4,210,624 | 7/1980 | Price . |
| 4,250,911 | 2/1981 | Kratz . |
| 4,303,515 | 12/1981 | Rademacher . |
| 4,419,233 | 12/1983 | Baker . |
| 4,610,848 | 9/1986 | Weber . |
| 4,732,689 | 3/1988 | Harvey et al. . |
| 4,867,196 | 9/1989 | Zetena et al. . |
| 7,515,910 | 4/1990 | Wood et al. . |

Primary Examiner—Alan Cohan
Attorney, Agent, or Firm—B. E. Burdick; R. D'Alessandro

[57] ABSTRACT

An improved chemical feeder employing periodic partial immersion in a forced circulation system is provided having a soluble chemical hopper, and a dissolving chamber into which the soluble chemical chamber extends an adjustable distance and a discharge chamber in fluid flow communication with the dissolving chamber to selectively receive chemically treated water from the dissolving chamber and discharge it into a flow loop connected to the forced circulation system. A visual indicator ring is preferably present to show the height of the hopper. The adjustable hopper allows an expanded range of chemical feed rates for the feeder.

15 Claims, 5 Drawing Sheets

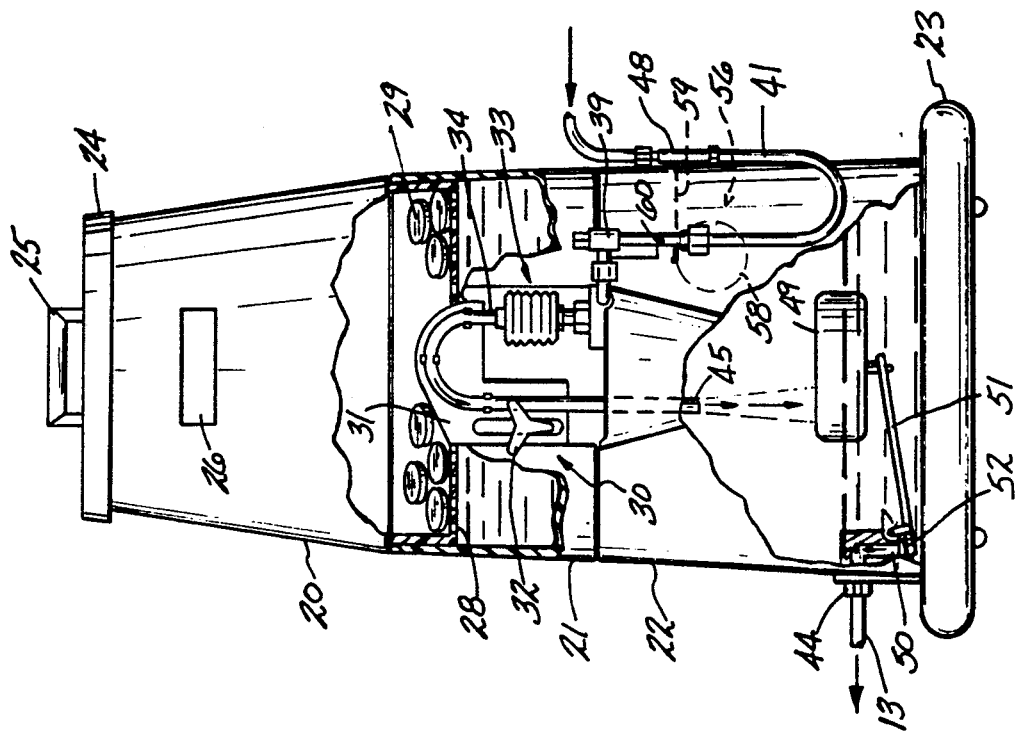
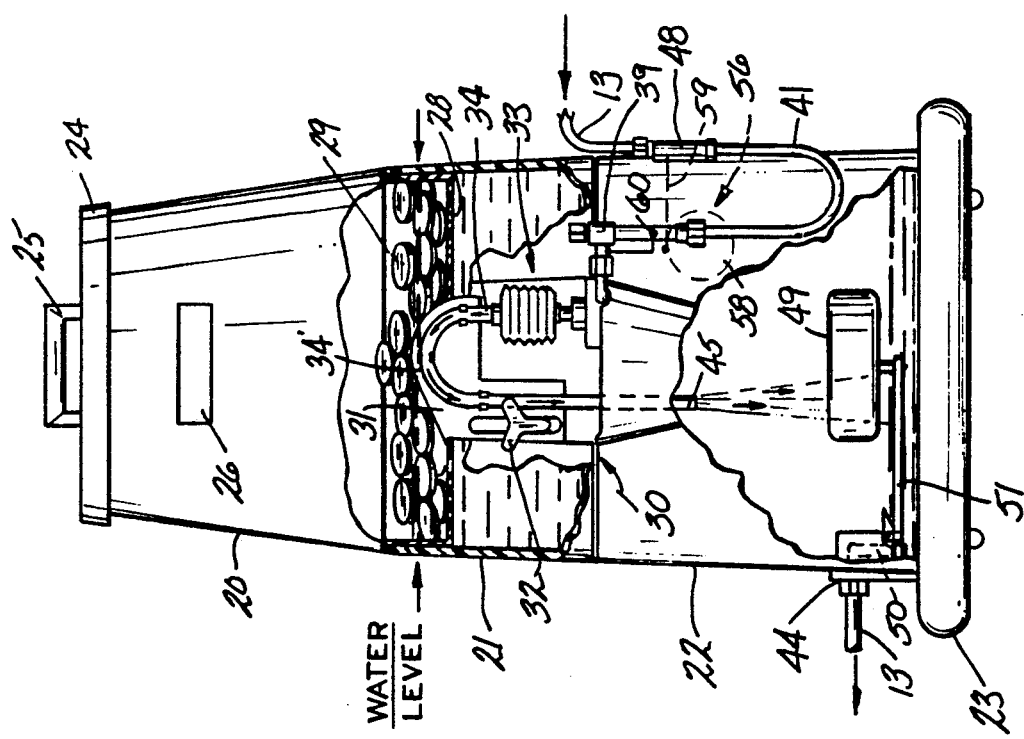

DUAL RANGE PERIODIC CHEMICAL DISPENSER FOR SWIMMING POOLS

BACKGROUND OF THE INVENTION

1. Field of the Invention

This invention relates generally to apparatus for dispensing soluble material into a surrounding body of water. More particularly this invention deals with apparatus that dissolves and dispenses a soluble sanitizing material, preferably calcium hypochlorite, into a body of water, such as a swimming pool utilizing forced circulation.

2. Description of the Prior Art

Chemical feeders, used in previous forced flow or circulation systems, have certain common features. All have typically had a dissolving tank or chamber in which the dissolving of the chemical occurs and a chemical retainer in which the chemical is placed. The dissolving liquid, normally water, is typically fed into the dissolving tank by some control apparatus to ensure the proper amount of chemical dissolved.

Prior equipment, however, normally has suffered from wide fluctuations or variations in the amount of chemical that is dissolved and fed into the water. Most dispensers have utilized a solid chemical that is at least partially immersed in water to effect the dissolution.

Where the chemical is a solid hypochlorite, such as calcium hypochlorite, the solid residue of the chemical has presented either aesthetic or functional problems. When the solid residue has gotten into the forced circulation system, it has resulted in unsightly accumulation on the pool bottom. Build up within the feeder apparatus has resulted in clogging and eventual shutdown of the apparatus. This problem is compounded when larger, commercial pools are treated and larger feeders or dispensers must be used. This clogging also affects the reliability of the feed rate of the chemical into the pools, as well as increasing the frequency of maintenance for these prior feeders.

One particularly successful feeder is that shown in U.S. Pat. No. 4,867,196, issued Sep. 19, 1989 to C. M. Zetena et al, which selects a feed rate by changing the immersion height of the tablets through the use of a movable siphon tube. The feeder has three separate chambers: a discharge chamber, a dissolving chamber and a removable tablet container or hopper. Such units give a reliable feed rate control within a limited range. For a given size the feeding rate has a range determined by the maximum and minimum immersion allowed by the siphon tube and the frequency of immersion. It would be desirable to increase the feed rate range of such units so as to serve larger pools where a wider range of feed rates are needed.

The present invention solves this need by providing an adjustable tablet chamber which can be selectively raised or lowered between two positions to provide an additional range to the feed rate.

SUMMARY OF THE INVENTION

It is an object of the present invention to provide an improved soluble solid chemical dispenser for a forced circulation system.

It is another object of the present invention to provide an improved calcium hypochlorite dispenser suitable for use in large commercial pools.

It is a feature of the present invention that the calcium hypochlorite dispenser utilizes three separate chambers to achieve uniform and controlled release of the calcium hypochlorite into the pool circulation system.

It is another feature of the present invention that a siphon tube is used to control the amount of water which immerses the solid pool chemical and, therefore, the concentration of the dissolved pool chemical, in the dissolving chamber and the flow of that water into the discharge chamber.

It is still another feature of the present invention that the dispenser utilizes periodic partial immersion to dissolve the chemical in the dissolving chamber.

It is an advantage of the present invention that a solid soluble chemical, such as calcium hypochlorite, is easily dispensed into large commercial sized swimming pools.

It is another advantage of the present invention that clogging of the dispensing apparatus from chemical residue is avoided.

These and other objects, features and advantages are obtained in the three chambered apparatus for dissolving and dispensing solid calcium hypochlorite into a swimming pool wherein the chemical is placed in a chemical chamber that extends down into a dissolving chamber that overlies and is in flow communication with the discharge chamber. The level of water that flows into the dissolving chamber is controlled by a siphon tube or other vertically adjustable flow controller that controls the release of treated water from the dissolving chamber into the discharge chamber and by a vertically adjustable chemical tablet chamber which can be raised or lowered to provide two, preferably separate, ranges of chemical feed rates.

Preferably, the chemical chamber is also interconnected with a visual indicator to indicate which feed rate range has been selected.

BRIEF DESCRIPTION OF THE DRAWINGS

The objects, features and advantages of the present invention will become apparent upon consideration of the following detailed disclosure of the invention, especially when it is taken in conjunction with the accompanying drawings wherein:

FIG. 5 is a side elevational view of the chemical dispenser with portions broken away to show the water level in the dissolving chamber as the siphon tube assembly begins to drain the water from the dissolving chamber into the discharge chamber, as well as showing the chemical chamber extending into the dissolving chamber so that the solid chemical is partially immersed;

FIG. 6 is a side elevational view of the chemical dispenser with portions broken away to show the water levels in the dissolving chamber and the discharge chamber after the chemically treated water has started to flow into the flow loop of FIG. 1 enroute to the pool and the water level has dropped below the level of the solid chemical in the chemical chamber.

DETAILED DESCRIPTION OF THE PREFERRED EMBODIMENT

Figure 1:
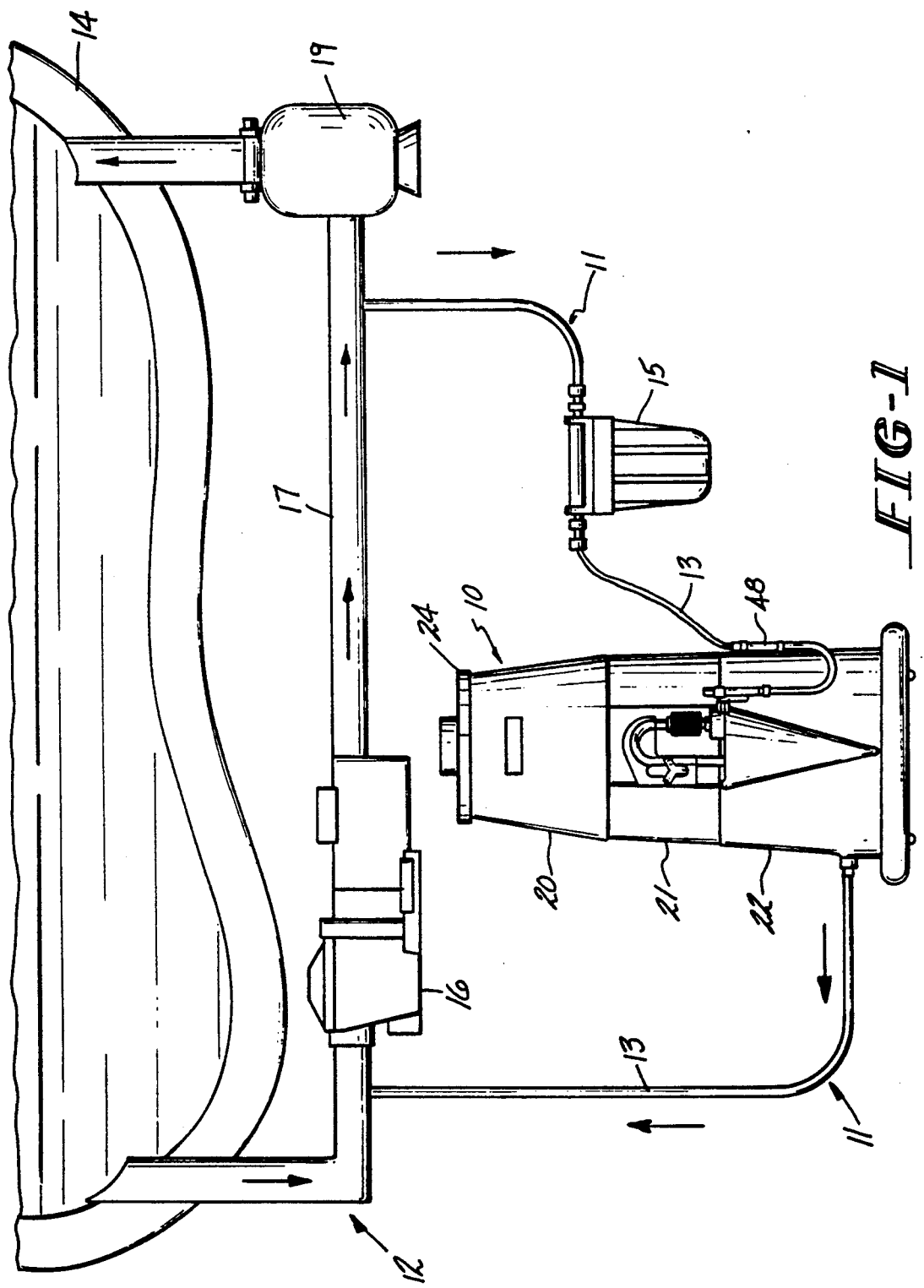
FIG. 1 is a diagrammatic illustration of the pool chemical dispenser of the present invention shown connected via a flow loop to a swimming pool.

FIG. 1 discloses the positioning of the pool chemical dispenser, indicated generally by the numeral 10, in the flow loops, indicated generally by the numerals 11 and 12, for the pool 14. Loop 11 connects the dispenser 10 to the pool flow loop 12 by a dispenser flow line 13. Flow line 13 has a filter and housing 15 attached via appropriate fittings on the feed side to receive water from the pool flow loop 12 downstream of forced circulation pump 16. Alternatively, filter 15 could be eliminated and the dispenser fed from the downstream side of the pool filter 19. Pool circulation flow line 17 circulates water from the pool 14 and a skimmer feeder (not shown) via forced circulation pump 16 through a pool filter 19 back into the pool. The outlet side of loop 11 connects into loop 12 on the upstream side of pump 16.

Figure 2:
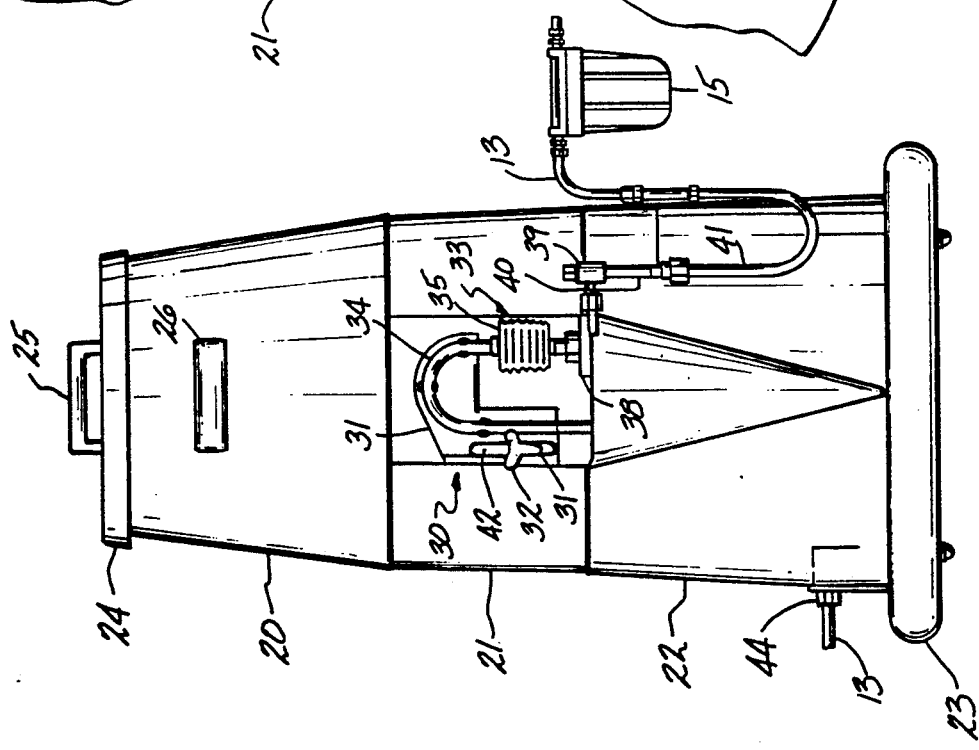
FIG. 2 is a side elevational view of the pool chemical dispenser.

As seen generally in FIG. 1 and more specifically in FIG. 2, dispenser 10 has an upper soluble material or chemical chamber 20, an intermediate dissolving chamber 21, inside of which the chemical chamber 20 seats, an indicator ring 100 between chambers 20 and 21, and a lower discharge chamber 22, inside of which the dissolving chamber seats. The three chambers 20, 21 and 22 are separate, facilitating cleaning and maintenance. The discharge chamber outlet check valve is shown as numeral 44 exiting the side of the discharge chamber 22 and connecting with the dispenser flow line 13 (outlet side of loop 11).

As is best seen in FIGS. 5 and 6 the chemical chamber 20 has a chemical support grid 28 which is perforated on the bottom to permit water in the dissolving chamber 21 to rise up therethrough into contact with the pool chemical tablets 29 to dissolve the tablets. Chemical chamber 20, when seated with notches 101 or 102 on lug 110 in dissolving chamber 21, extends down into chamber 21 to one of two selected heights so the solid chemical tablets 29 supported by grid 28 are partially immersed as the water fill cycle periodically fills the dissolving chamber 21 to the desired level determined by the water level control means, indicated generally by the numeral 30, in a manner that will be explained hereafter.

Chemical chamber 20 is seen with a hinged top 24 to permit easy refill of the tablets 29. Chamber 20 has a recess 25 to permit easy removal of chamber 20 from the dissolving chamber 21 and to expose top 24 for easier opening.

Figures 4, 4A:
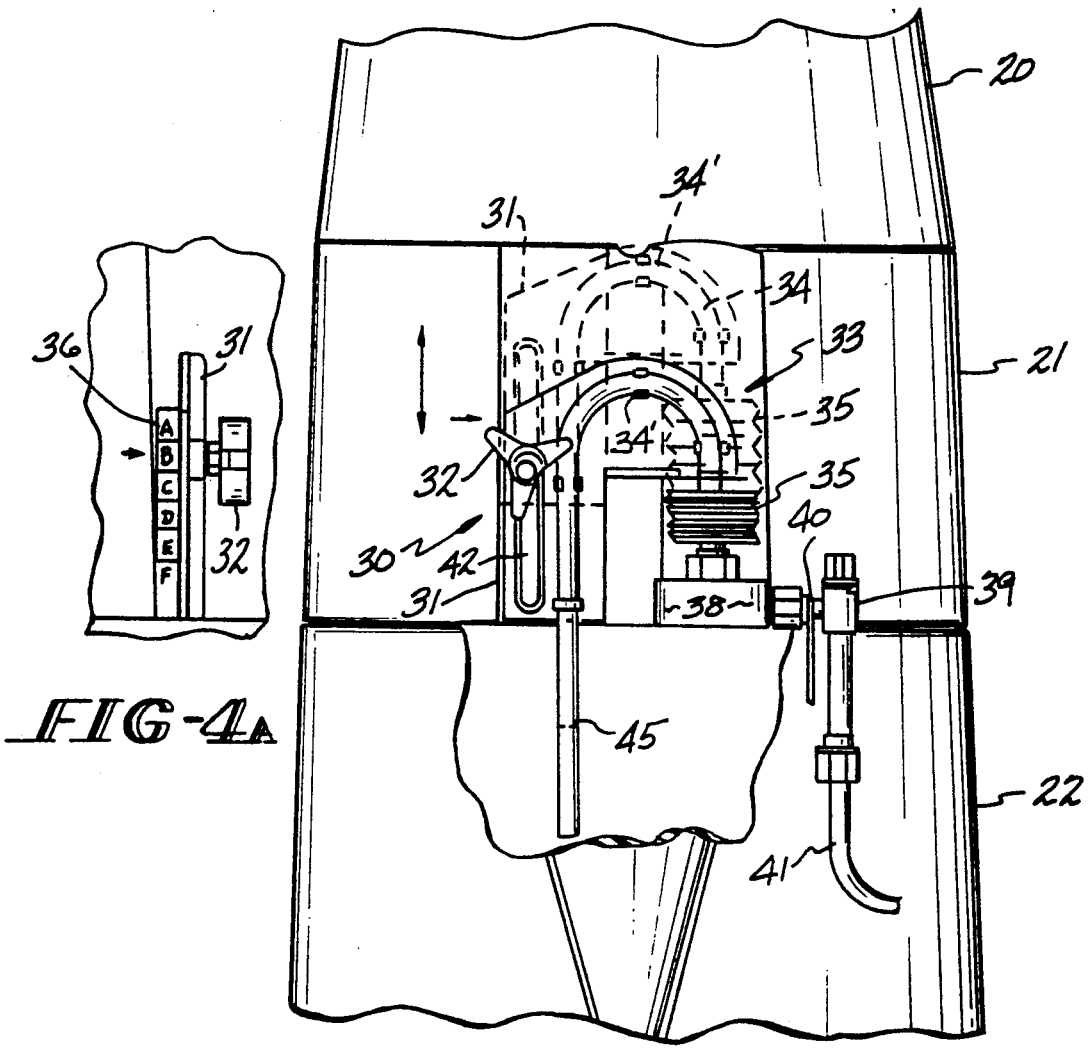
FIG. 4 is an enlarged partial side elevational view with a portion of the dispenser cut away and broken off to show the vertical adjustability of the siphon tube apparatus.
FIG. 4A is an enlarged side elevational view of the settings and the siphon tube apparatus that is vertically adjustable to a plurality of heights.

As is best seen in FIGS. 2 and 4, dissolving chamber 21 has the aforementioned water level control means 30 fastened thereto. This consists of a vertically adjustable control plate 31 and a lock knob 32 that tightens via a conventionally threaded screw to retain the plate 31 at the desired height. FIG. 4 shows control plate 31 in a lowered position in solid lines and in a raised position in phantom lines. Control plate settings 36 are shown in FIG. 4A. Control plate slot 42 permits the control plate to be vertically adjustable.

Siphon assembly, indicated generally by the numeral 33 in FIGS. 3-6, is part of the water level control means 30 that permits the vertical adjustability to be achieved. Bellows 35 are formed from an appropriate flexible material, such as polyethylene, to allow the siphon tube 34 to be raised or lowered. This adjustability is best illustrated in FIG. 4 where the phantom lines show siphon tube 34 and control plate 31 in an elevated position and the solid lines show the same apparatus in a lowered position. Siphon tube 34 is formed from a suitable material, such as polyethylene or other plastic tubing, and is curved or arcuate in shape to permit it to be fastened to control plate 31 and to effectively function as a siphon break, moving up or down with control plate 31. Siphon tube lower section 45 of FIG. 4 is merely raised or lowered in the discharge chamber 22 as the control plate 31 is adjusted.

Figure 3:
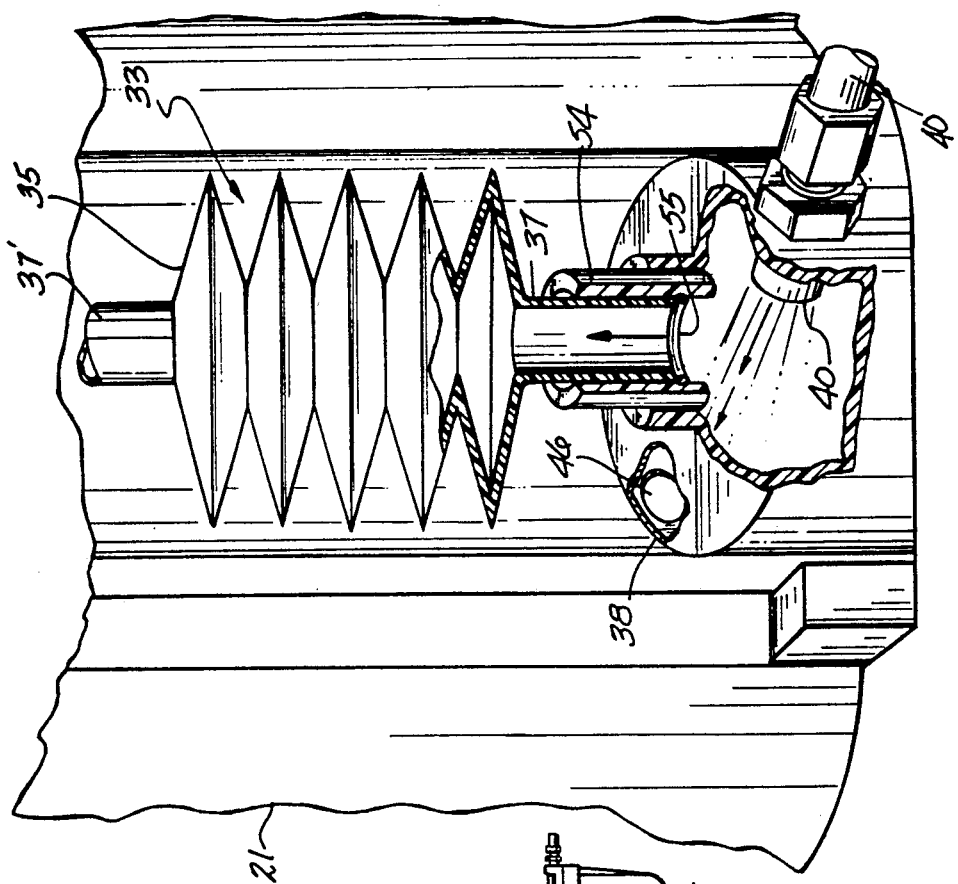
FIG. 3 is an enlarged view of the inlet for water that feeds into the siphon tube apparatus to feed water into the dissolving chamber, with a portion cut away to show the flow paths.

The curved upper portion of siphon tube 34 functions to control the water level attained in the dissolving chamber 21 from the water flowing in through the flow indicator 39 and the flow indicator feed line 41 to the flow indicator inlet connection 38 via the flow indicator outlet stem tube 40 of FIG. 3. Opening 46 in the inlet connection 38 opposite the outlet stem tube 40 permits the water to flow into and out of dissolving chamber 21 to cause the water level to rise and allow the water level to drop in dissolving chamber 21. The hydraulic pressure within the inlet connection 38 from the water level in dissolving chamber 21 causes the water to rise up through bellows tubing 37 into the bellows 35 section so that the water level in the bellows is the same as the water level in the dissolving chamber 21. Bellows tubing 37 inserts within a stub connection 54 in the flow indicator inlet connection 38 and seats atop O-ring 55 recessed into the inner wall of stub connection 54 to effect a liquid tight seal.

As the water level continues to rise in dissolving chamber 21, the water rises through the bellows 35 section into the upper bellows tubing 37' and then into the siphon tube 34. Once the water level is sufficiently high in dissolving chamber 21 so that the corresponding water level in the siphon tube 34 rises into the curved portion 34' of the siphon tube 34, as seen in FIG. 5, the water starts draining through siphon tube 34 into the discharge chamber 22 at a faster flow rate than the water is flowing in through the flow indicator feed line 41 from the dispenser flow line 13 and the flow controller 48. The siphon tube 34 siphons the chemically treated water from the dissolving chamber 21 back through the flow indicator inlet connection opening 46 of FIG. 3 until the water is drained from the dissolving chamber 21 into the discharge chamber 22. The filling of the discharge chamber 22 and the corresponding lowering of the water level in the dissolving chamber 21 so the pool chemical tablets 29 are no longer immersed in water is shown in FIGS. 5 and 6.

Siphon assembly 33 stops the draining of water through siphon tube 34 from the dissolving chamber 21 to the discharge chamber 22 when air enters the bellows tube 37 in the flow indicator inlet connection because the chemically treated water with the dissolved pool chemical from the tablets 29 has been siphoned off to the lower discharge chamber 22 faster than the inlet flow of water so an air gap is created between the water level in the dissolving chamber and in the flow indicator inlet connection 38 and the bottom of bellows tube 37.

This air breaks the siphon and permits the refill of the dissolving chamber 21 to occur to achieve the partial immersion of the pool chemical tablets 29 to recommend the periodic immersion and dissolution cycle. The diameter of the bellows 33 and bellows tube 37 must be wider than the siphon tube 34 to ensure there is a definite air/water break.

Figure 7:
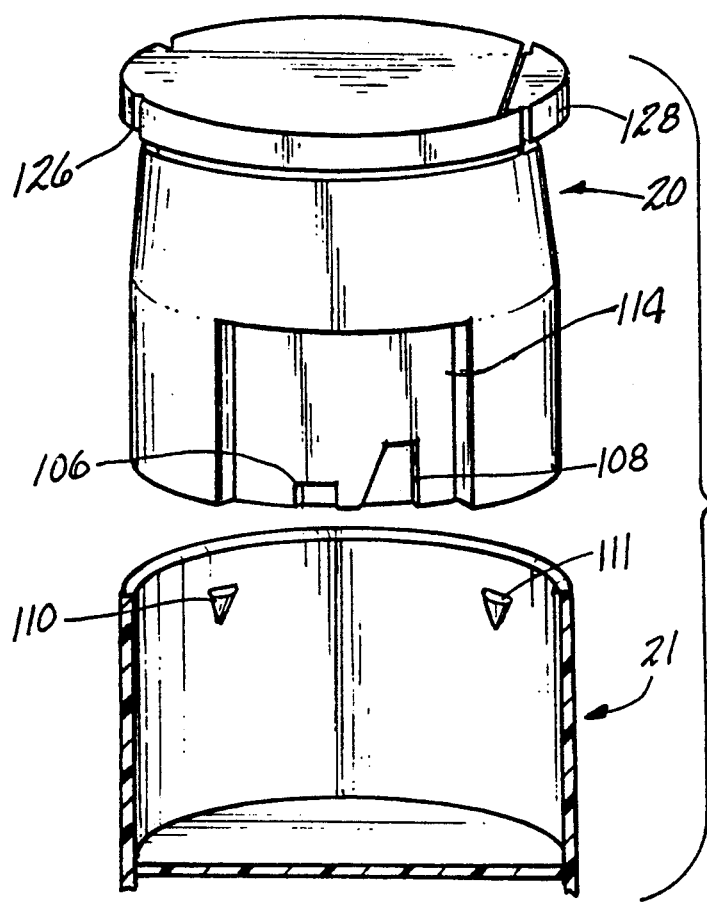
FIG. 7 is a partial front perspective view of the dispenser showing how the chemical dispenser fits into the dissolving chamber; and, FIG. 8 is a partial front perspective view of the dispenser showing the feed rate indicator.
Figure 8:
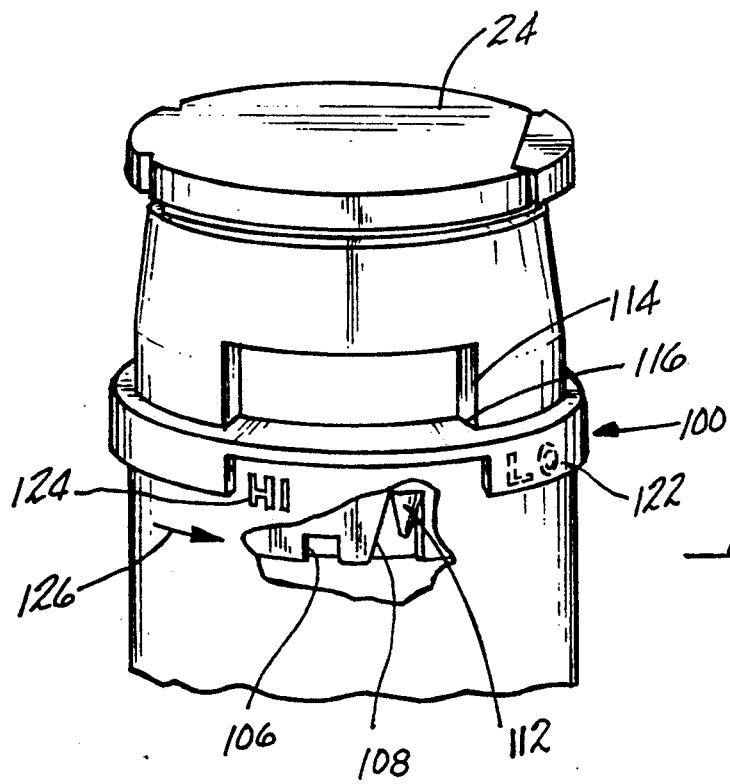

Referring now to FIG. 7, a structure for providing vertical adjustability of chemical chamber 20 is shown. Chamber 20 has three sets of external notches 106, 108 of which only one set is shown for simplicity. Dissolving chamber 20 has three internally projecting lugs 110, 111, 112 (see FIG. 8) which match the other two sets of notches 106, 108 which are not shown. The third lug is shown in FIG. 8.

The chemical chamber ("hopper") 20 is rotated to either allow notch 106 or 108 to rest on lug 112. If notch 108 rests on lug 112, the chemical chamber 20 sits lower in dissolving chamber 21. This lower position gives a higher feed rate.

Referring again to FIG. 7, chemical chamber 20 has an external recess 114 of an annular segmental shape. This recess is shown in FIG. 8 to mate with a matching internal ring lug 116 on an indicator ring 100. When chemical chamber 20 is rotated ring 100 is rotated. Ring 100 has a downwardly projecting shield flange 120 which selectively covers only one of two "HI"-"LO" markings. Since lug 112 is in notch 108, shield flange 120 covers the "LO" marking 122 and does not cover the "HI" marking 124. If chamber 20 is lifted and rotated counterclockwise, as shown by arrow 126 the "LO" marking would be exposed and the "HI" marking covered.

In order to prevent loss of the lid to chemical chamber 20, top 24 preferably is connected to the rest of chamber 20 by a hinge 126 and held in place by a latch 128.

In order to cause chemical chamber 20 to be inserted correctly, ring 100 also serves as an alignment guide due to the required alignment of recess 114 with internal ring lug 116. Also, rear lugs 110, 111 (and the unshown matching rear notches of chamber 20) can be less than 120° apart, so that all three lugs can only find a corresponding notch if the chemical chamber 20 is inserted correctly.

It will be appreciated that the particular construction of chemical chamber 20, ring 100, indicators 122, 124 and lugs 110, 111, 112 make a relatively "fool-proof" assembly. The hinged lid 24, 126, 128 also helps prevent mistakes.

The height of the lugs 110,111,112 above the bottom of dissolving chamber 21 and the height of the top of notches 106,108 above the bottom 28 of chemical chamber 20 will preferably be selected to provide two separate feed rate ranges. Water-level control means 30 can then adjust the feed rate more precisely within the range selected. For example, positioning notch 106 (the "LO" range notch) on lug 112 might give a feed rate with HTH ® brand dry chlorinator (the leading brand of pool chlorination chemical) within the range of from about 2.8 to about 22 pounds per day, and positioning notch 108 (the "HI" range notch) on lug 112 might give a feed rate with the HTH ® brand dry chlorinator within the range of from about 26 to about 48 pounds per day.

Flow controller 48, as seen in FIGS. 1, 5 and 6, provides a constant flow of water into the dispenser 10 via the dispenser flow line 13. This constant flow compensates for pressure fluctuations in the pump 16 of FIG. 1 that result from accumulation of residue that can obstruct flow in loop 12, and hence in dispenser flow loop 11 which can vary by as much as 15-35 pounds per square inch. The constant flow achieves uniform dissolution of the pool chemical tablets 29, resulting in a uniform pool chemical, such as chlorine, feed rate by having uniform cycle times between the filling of dissolving chamber 21 and the draining into discharge chamber 22.

The water level in chamber 22 rises so that the normally closed discharge chamber outlet check valve 44 is opened by the action of discharge chamber outlet valve float 49 rising up with the increasing water level to open outlet orifice 50. This permits the chemically treated water to flow out through outlet check valve 44 into the dispenser flow line 13 to be drawn into the downstream side, with respect to circulation pump 16, of the pool circulation flow line 17. Circulation pump 16 then pumps the chemically treated water as shown in FIG. 1 through the filter 19 into the pool 14. Float 49 raises via the pivoting of a pivot arm 51 that pivots downward on the opposing discharge chamber outlet check valve 44 end to drop the valve cap 52 below the outlet orifice 50 to uncover the orifice 50.

As the water drains from the dissolving chamber 21 into the discharge chamber 22 via the siphon assembly 33, the unchecked flow of water into the dispenser 10 via the flow indicator feed line 41 is prevented by a safety overflow assembly, indicated generally by the numeral 56, in FIGS. 5 and 6. Assembly 56 consists of a ball float 58, which is mounted on a float arm 59, that rise upwardly when the water level in discharge chamber 22 reaches the level of the float 58. Float arm 59 extends into the flow controller 48 and connects with a suitable flow interrupter (not shown) which closes off the flow path through flow indicator feed line 41 to stop the flow of water into the dispenser 10. Once sufficient water has exited the discharge chamber 22 via the discharge chamber outlet check valve 44 and dispenser flow line 13, the ball float 58 and float arm 59 drop to reopen the flow path through the flow controller 48.

Flow indicator 39 has a ball 60 inside the clear tubing portion to indicate water flow and the quantity of water flowing into the dispenser 10. When the water flow drops below a predetermined rate indicated, for example, by a flow line on the clear tubing portion, the filter 15 in FIG. 1 requires cleaning. Flow indicator 39 can also have a shutoff valve incorporated into its top in addition to or in lieu of the safety overflow assembly 56 to stop all flow of water into the dispenser 10. The normal flow rate of water out through the siphon assembly 35 is about two times the rate of water entering the dissolving chamber through the flow indicator inlet connection to ensure that the chemically treated water can be siphoned out of the dissolving chamber 21 and a siphon break achieved to stop the flow.

The three chambers 20, 21 and 22 of dispenser 10 are made of any appropriate chlorine resistant material. Preferred is polyethylene, although polyacrylate and polycarbonate are two examples of the many other suitable materials that may be employed. Chemical chamber 20 is tapered so that it is narrower at the top than at the bottom to prevent bridging of the pool chemical tablets 29. This insures a continuous supply of tablets 29 on the chemical support grid 28 for periodic immersion.

In operation, pool chemical tablets 29 are placed in the chemical chamber 20 of dispenser 10 by removal of top 24 after the dispenser 10 has been connected to the pool flow loop 12 of FIG. 1 via the flow loop 11. The control plate 31 is elevated to the desired height and secured in position by tightening the lock knob 32 to control the depth of immersion of the pool chemical tablets 29 in water in the dissolving chamber 21. This setting, selected from the control plate setting 36, also determines the cycle time of the periodic immersions because the siphon tube 34, with its upper curved portion 34', moves with the control plate 31 to determine the water level at which the siphon assembly 33 siphons water from the dissolving chamber 21 into the discharge chamber 22. The amount of time which the pool chemical tablets 29 spend immersed in the water and the quantity of tablets 29 immersed also determine the concentration of the soluble pool chemical in the quantity of water in the dissolving chamber. Flow indicator 39 shows the continued flow of water into the flow indicator inlet connection 38 and, via the inlet connection opening 46, into the dissolving chamber 21.

As the water level in the dissolving chamber 21 rises, the water in the siphon assembly 33 correspondingly rises to the same height up through bellows tube 37, bellows 35, upper bellows tube 37' and siphon tube 34. When the water level inside dissolving chamber 21 and the corresponding level in the siphon assembly 33 reaches the height of the siphon tube curved top portion 34', the water in the siphon assembly flows through the curved top portion 34' and drains out the lower straight section 45 into the discharge chamber 22.

The water in dissolving chamber 21 continues to be siphoned into discharge chamber 22 until an air gap develops between the water level in flow indicator inlet 38 and the lower bellows tube 37. As the water rises in discharge chamber 22 the outlet valve float 49 raises to open the outlet orifice 50 via float pivot arm 50. Once outlet orifice 50 is opened the chemically treated water in the discharge chamber 22 is released into the flow loop 11 where it is drawn into the pool flow loop 12 by the forced circulation of the water by circulation pump 16.

While the preferred structure in which the principles of the present invention have been incorporated is shown and described above, it is to be understood that the invention is not to be limited to the particular details thus presented, but, in fact, widely different means may be employed in the practice of the broader aspects of this invention. The scope of the appended claims is intended to encompass all obvious changes in details, materials, and arrangement of parts which will occur to one of skill in the art upon a reading of the disclosure.

What is claimed is:

1. A pool chemical dispensing unit, which comprises:
   a hopper for containing a quantity of water soluble chemicals, the hopper having a bottom;
   a dissolving chamber surrounding at least a lower portion of the hopper, the dissolving chamber having a bottom;
   an intermittent immersion system for intermittently introducing water into the dissolving chamber to a selected maximum level above the bottom of the hopper;
   a height adjuster adjustably interconnecting the chamber and hopper for adjusting the height of the bottom of the hopper relative to the bottom of the dissolving chamber to one of a plurality of preselected heights, the height adjuster including at least two notches on one of the hopper and the dissolving chamber and at least one lug on the other of the hopper and dissolving chamber adapted to interengage in selective positions to position the bottom of the dissolving chamber at one of the plurality of preselected heights;
   a water supply in fluid communication with the dissolving chamber for supplying water to the immersion system and receiving water from the dissolving chamber; and
   a water level controller for selecting and controlling the maximum level of water in the dissolving chamber.

2. The unit of claim 1, wherein the height adjuster is adapted to adjust to only one of two preselected heights.

3. The unit of claim 2, wherein the two positions of the height adjuster are sufficiently far apart that the volume of water in the dissolving chamber external to the hopper at the maximum water height is at least 30% less at one position than at the other position.

4. The unit of claim 3, wherein the unit further comprises a visual indicator for automatically giving a high or low indication responsive to the preselection of the height by the height adjuster.

5. The unit of claim 1, wherein the highest and lowest positions of the height adjuster are sufficiently high apart that the volume of water in the dissolving chamber external to the hopper at the maximum water height is at least 30% less at one position than at the other position.

6. The unit of claim 5, wherein the unit further comprises a visual indicator for automatically giving a high or low indication responsive to the preselection of the height by the height adjuster.

7. The unit of claim 5, wherein the water level controller is a siphon tube of adjustable height.

8. The unit of claim 1, wherein the unit further comprises a visual indicator for automatically giving a high or low indication responsive to the preselection of the height by the height adjuster.

9. The unit of claim 1, wherein the height adjuster has at least three lugs and at least three sets of two notches, whereby to better prevent tilting of the hopper within the dissolving chamber.

10. The unit of claim 8, wherein the water level controller is a siphon tube of adjustable height.

11. The unit of claim 1, wherein the hopper, dissolving chamber are made of corrosion-resistant, nonmetallic materials.

12. The unit of claim 9, wherein the lugs are vertically tapered sections leading to radial engagement shoulders.

13. The unit of claim 12, wherein the lugs are on the dissolving chamber and the notches are on the hopper, whereby the hopper can have a smooth exterior without projections.

14. The unit of claim 11, wherein the height adjuster has at least three lugs and at least three sets of two notches, whereby to better prevent tilting of the hopper within the dissolving chamber.

15. The unit of claim 14, wherein the hopper is cylindrical, the dissolving chamber has a cylindrical inner wall congruent with and slightly larger than the hopper, and the lugs are spaced evenly at 120 degree intervals about the inner wall of the dissolving chamber.

* * * * *